United States Patent [19]
Little et al.

[11] Patent Number: 5,758,060
[45] Date of Patent: May 26, 1998

[54] HARDWARE FOR VERIFYING THAT SOFTWARE HAS NOT SKIPPED A PREDETERMINED AMOUNT OF CODE

[75] Inventors: Wendell L. Little, Denton; Matthew K. Adams; David A. Bunsey, Jr., both of Dallas, all of Tex.

[73] Assignee: Dallas Semiconductor Corp., Dallas, Tex.

[21] Appl. No.: 611,037

[22] Filed: Mar. 5, 1996

[51] Int. Cl.[6] .................................................. G06F 11/00
[52] U.S. Cl. ........................ 395/183.06; 395/185.01; 395/184.01; 395/183.01; 364/DIG. 1
[58] Field of Search ................. 395/200.06, 183.21, 395/726, 183.06; 364/184

[56] References Cited

U.S. PATENT DOCUMENTS

| | | | |
|---|---|---|---|
| 4,338,660 | 7/1982 | Kelly et al. | 395/183.1 |
| 4,747,048 | 5/1988 | Mueller | 364/184 |
| 5,157,782 | 10/1992 | Tuttle et al. | 395/183.21 |
| 5,218,605 | 6/1993 | Low et al. | 395/183.21 |
| 5,327,564 | 7/1994 | Little | 395/726 |
| 5,521,849 | 5/1996 | Adelson et al. | 364/570 |
| 5,561,770 | 10/1996 | de Bruijn et al. | 395/200.06 |

*Primary Examiner*—Tod R. Swann
*Assistant Examiner*—David Langjahr
*Attorney, Agent, or Firm*—Jenkens & Gilchrist

[57] ABSTRACT

A hardware circuit for verifying the execution of software is disclosed wherein the circuit compares a stored value with another value that is stored at at least one predetermined time in the course of program execution. If the two values correspond in some predetermined fashion then it is verified with a level of certainty that the program executed the program steps at or near the predetermined times.

20 Claims, 2 Drawing Sheets

5,758,060

HARDWARE FOR VERIFYING THAT SOFTWARE HAS NOT SKIPPED A PREDETERMINED AMOUNT OF CODE

CROSS REFERENCE TO RELATED APPLICATIONS

This application is related to the following U.S. patent applications:

| Ser. No. or Pat. No. | TITLE | INVENTOR (S) |
| --- | --- | --- |
| 08/611035 | One-Wire Lock Processor System | Curiger, et al. |
| 08/611036 | Programmable Adaptive Timing | Curry et al. |

All of the related applications are filed on even date herewith, are assigned to the assignee of the present invention, and are hereby incorporated herein in their entirety by this reference thereto.

The following applications and patents of common assignee contain related subject matter and all of which are hereby incorporated by reference:

| Ser. No. | Title | Inventor (s) |
| --- | --- | --- |
| 08/346,556 | Electrical/Mechanical Access Control Systems and Methods | Glick et al. |
| 08/220,425 | Electrical/Mechanical Access Control Systems and Methods | Glick et al. |
| 08/492,660 | Electronic Key with Three Modes of Electronic Disablement | Pearson et al. |
| 08/331,255 | One-Wire Bus Architecture | Lee |
| 08/347,913 | Systems and Methods to Convert Signal Multiplexed on a Single Wire to Three Wire | Lee |
| 08/347,912 | Command Data Protocol | Lee |

| Pat. No. | Title | Inventor (s) |
| --- | --- | --- |
| 5,210,846 | One-Wire Bus Architecture | Lee |
| 5,398,326 | Method for Data Communication | Lee |

BACKGROUND OF THE INVENTION

1. Technical Field of the Invention

The invention relates to hardware circuits for verifying software functionality, and more particularly, to verify software has not skipped critical steps in a program prior to proceeding to a predetermined place in a software algorithm.

2. Description of Related Art

Electronic signals generated by software are used to drive or initiate events of all types. Such signals might be used to actuate a motor which performs a certain function. As an example, an actuation signal might cause an automatic teller machine to dispense money. Another example would be that such a signal could be used to actuate the motor of an electronic lock system for unlocking a door to allow access. As another example, such a signal might be used to provide access to a computer or to data within a computer wherein such data is valuable or confidential and wherein it is critical to maintain data integrity.

For each of the above examples, an identification (ID) or signal is received by a system. The system's software compares the received ID with a stored ID to verify that the ID is valid prior to issuing a signal to cause various types of subsequent action or actuation.

For each of the above-mentioned examples, dire consequences could occur if an actuation signal is erroneously issued by the software. In the case of the automatic teller machine, money could be erroneously dispensed. In the case of the electronic lock, unauthorized access to a secured area could occur. In the case of the electronic data base, an erroneous data entry or deletion could occur, thereby corrupting the integrity of the data within.

While it is generally true that devices are tested and placed on the market only after being found to be operational, it is also true that devices occasionally malfunction. For example, if part of generating an initiation signal includes performing a software verification of an identity then, theoretically, such initiation signal would never issue unless the identity of a user was verified and determined to be proper. However, with the use of software algorithms that perform verification, there exists a remote, but real possibility that a computer could, due to a glitch, neglect to perform a verification procedure and erroneously initiate a subroutine that generates an initiation request signal. As such, for those applications where it is important to verify that the software has performed an accurate verification prior to initiating an enable signal, there is a need for an independent hardware circuit which is not subject to software malfunctions which performs a verification that the software completed all the required steps prior to allowing the generation of an initiation signal.

SUMMARY OF THE INVENTION

The presently disclosed invention relates to a system wherein a microprocessor based circuit steps through a predetermined algorithm via firmware and/or software instructions while a hardware circuit checks to make sure that the microprocessor did not skip any critical steps in the instructions prior to completing the algorithm.

The object of the present invention is to provide a system wherein a hardware circuit verifies that a microprocessor has not skipped any critical steps in an instruction set prior to initiating a result of the instruction set.

Another object of the present invention is to provide a system that is used to control access wherein prior to providing access the system checks to make sure that the system did not make a mistake in determining that access should be allowed to a user. The system may control a vast variety of access control mechanisms such as locks, doors, money dispensing machines, files, filing systems, etc.

BRIEF DESCRIPTION OF THE DRAWINGS

Other advantages and novel features of the present invention will become apparent from the following detailed description of the invention when considered in conjunction with the accompanying drawings in which.

DETAILED DESCRIPTION OF THE PRESENTLY PREFERRED EXEMPLARY EMBODIMENTS

Figure 1:
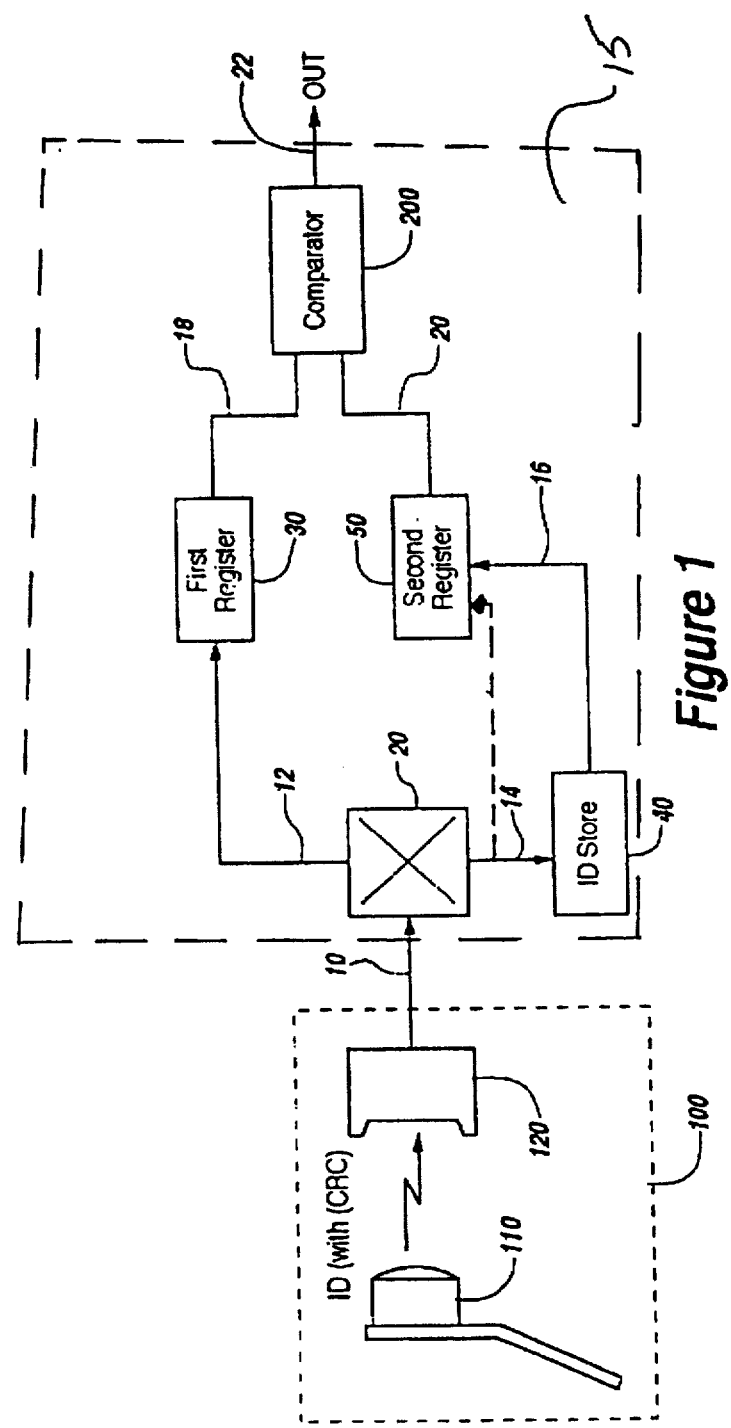
FIG. 1 is a block diagram illustrating one embodiment of the invention.

Referring generally to FIG. 1, the purpose of the present invention is to make sure that a microprocessor based system 15 carries out critical steps in a predetermined algorithm or program. For example, if the microprocessor is being used to control a motor which locks or unlocks a door, the owner of the lock would like to have confidence that the microprocessor did not get "lost" and skip a critical portion of software that determines whether the "key" inserted into the lock is a valid key. Then after skipping the critical portion of software, the microprocessor lands at the portion of software instructions that unlocks the door and does so. The present invention would make sure, with reasonable certainty, that the critical portion of software was not skipped prior to allowing the door to be unlocked.

Ideally, the splitter 20 is part of a software controlled microprocessor system 15. The splitter 20 places a first predetermined value, such as a cycle redundancy check (CRC) or ID value, in the first register 30. At a critical point in the software, the microprocessor will place a second value, which is related in some way to the value placed in first register 30, in second register 50. The comparator 200 will compare the values of the first and second registers (30 and 50) and determine if the values have a proper relationship. If a proper relationship exists, then there is a strong probability that the critical portion of software was not skipped over by the microprocessor and output 22 will be a signal that allows the door to unlock.

The present invention could store predetermined numbers, for example, in the second register 50, at various critical points in the software program. The predetermined numbers would coincide with numbers established and stored in first register 30 prior to the microprocessor stepping through the critical portions of software. The comparator 200 would check to make sure all the numbers in the first register 30 coincide with the numbers stored in second register 50. If all the numbers coincide, then one could be substantially sure that steps in the software were not skipped.

This invention has applications in various microprocessor based systems, but only a system wherein an electronic key is used to open a lock is presented in this specification. One of ordinary skill in the art would readily see the variations of the invention wherein software/firmware is verified to have stepped through all of the required critical algorithm steps prior to coming to a result that would allow, for example, access via a lock or a transfer of money via an automatic money machine to take place.

Referring again to FIG. 1, there is shown an ID source 100, a comparator 200, and circuitry which provides to the comparator two CRC values via lines 18 and 20. Comparator 200 only produces a signal reflecting an "enable" logic state upon concluding that an exact relationship exists between the numerical values, namely CRC values, received from each of the two registers (30 and 50).

More specifically, ID source 100, in this preferred embodiment, is comprised of an electronic key 110 and an electronic key detector 120 wherein electronic key 110 transmits an ID to electronic key detector 120. Such transmission can occur by any medium including, but not limited to, direct electrical contact, magnetic or electromagnetic transmission. The transmitted signals from the electronic key 110 to the electronic key detector 120 include a character or numerical set which reflects an identity of the electronic key 110, or of the user, or of something wherein such ID is used to control access.

While the ID source 100 is comprised of an electronic key 110 and an electronic key detector 120, in this embodiment an entirely different apparatus could be substituted therefor.

The sole requirement for the ID source 100 is that it be capable of producing a signal which reflects a request to initiate a subsequent function and which reflects an identity associated with the ID source 100. Such identity may be originated in a number of ways including electronic data entry by keyboard, magnetic strip or any other form of electronically embedded or electromechanically embedded identity information. The underlying presumption is that only devices or persons having identities which belong to a limited number of predefined identities are to be given access or power to initiate a given event.

The ID source 100 transmits a signal on line 10 to a splitter 20. The signal received in splitter 20 on line 10 reflects an initiation request and an identity. In this embodiment, the mere transmission of an identity reflects and works as an initiation request. Moreover, the identity is comprised of a portion containing a CRC value. The splitter 20 extracts the CRC value and transmits the same over line 12 to first register 30. The splitter 20 also transmits at least a part of the ID to an ID store 40 over line 14. Accordingly, ID store 40 extracts from its memory banks a previously stored CRC value associated with such ID and subsequently transmits the extracted CRC value to a second register 50 over line 16. Each of the registers 30 and 50 subsequently transmit the CRC values stored within to a comparator 200 over lines 18 and 20, respectively. Comparator 200 then performs a hardware comparison of the CRC values in each of the registers 30 and 50 and produces an output on line 22 reflecting the results of such comparison; that is comparator 200 then transmits a signal on line 22 reflecting whether the contents of registers 30 and 50 coincide.

Splitter 20 could be any one of a number of devices which are well known to those skilled in the art. Splitter 20 could consist of a demultiplexer which includes counter logic to switch the first portion of a signal to one destination and the second portion of a signal to a second destination. Splitter 20 could be a processor based device which performs such splitting through software. Thus, any one of a number of circuit designs could be used as a splitter 20. The requirement in this embodiment is that the splitter 20 transmits the signal received on line 10 from the ID source 100 such that a first portion of the signal is transmitted to one location and a second portion of the signal is transmitted to a second location.

In another embodiment of the present invention, however, splitter 20 could be a common node which is connected to first register 30 and to ID store 40 wherein the entire signal transmitted by ID source 100 is transmitted to first register 30 and to ID store 40. In this embodiment, ID store 40 uses the entire signal transmitted by ID source 100 to extract from its memory a data block which is to be transmitted to second register 50 over line 16 for comparison to the contents of first register 30. The contents within first register 30 consist of the ID received from circuit 100 while the contents of register 50 consist of an entire ID stored within ID store 40. Either some or all of the received ID is used as an address to extract the corresponding stored ID.

The previous discussion regarding splitter 20 relates to the form of the signal transmitted on line 10 by the ID source 100 and to what the design goals are of the practitioner in terms of what portion of such signal is to be compared and verified by the hardware. In one embodiment, a practitioner might desire to perform a comparison upon the entire ID. If by way of example, the signal transmitted on line 10 by the ID source 100 is 64 bits wide, wherein a portion of the 64 bits wide identification signal comprises a CRC, and the practitioner desires to perform a comparison on the entire identification signal, then splitter 20 could be comprised merely of a common node as was recited before. In such a case, by way of example, ID store 40 would only use a part of the received ID as an address to extract a stored ID. The extracted ID is then transmitted to register 50.

On the other hand, if the practitioner desires to perform a comparison of a portion of the ID, by way of example, a portion which reflects the signal's CRC value, then splitter 20 could be comprised of a device capable of separating such CRC value from the ID received over line 10 to transmit such CRC portion over line 12 to first register 30. Similarly, splitter 20 must also be capable of transmitting a portion of the signal to an ID store 40 which would use such portion of the signal to facilitate the extraction of a previously stored value relating to such signal and for the transmission of the same to second register 50 over line 16. Thus, by way of example, if the ID received by splitter 20 on line 10 is 64 bits wide containing a CRC value 8 bits wide, splitter 20 transmits the 8 bit CRC value to first register 30 over line 12 and either all of the remaining 56 bits or a portion thereof to ID store 40 over line 14. ID store 40 would then use the received signal to perform a lookup in its memory to extract a previously stored 8 bit CRC value and to transmit such CRC value to second register 50.

In the exemplary embodiment depicted in FIG. 1, first register 30 and second register 50 each would receive an 8 bit CRC value which would then be transmitted from first register 30 and second register 50, respectively, to comparator 200 for comparison.

The ID store 40 may also be comprised of different devices. The ID store 40 could be comprised of logic circuitry which analyzes the identification signal received on line 14 to perform a lookup in memory wherein such ID is used as an address or pointer for a specific memory register. Alternatively, ID store 40 could be a processor having internal memory or being in communication with a memory device wherein the processor utilizes its firmware or loaded software to analyze the ID and extract a corresponding CRC value from memory.

First register 30 and second register 50 also may be comprised of different and common types of registers. In one embodiment, first register 30 and second register 50 each comprise a shift register of a predetermined length for containing the CRC value.

In another embodiment, registers 30 and 50 have parallel input and output capability and lines 12 and 16 each consist of a plurality of parallel lines, one for each bit register of registers 30 and 50. Similarly, lines 18 and 20 which transmit to comparator 200 the contents of first register 30 and second register 50 also consist of parallel transmission lines. One skilled in the art can readily appreciate the various combinations and modifications which may be made through first register 30 and second register 50 and the corresponding lines 12, 16, 18 and 20.

Figure 2:
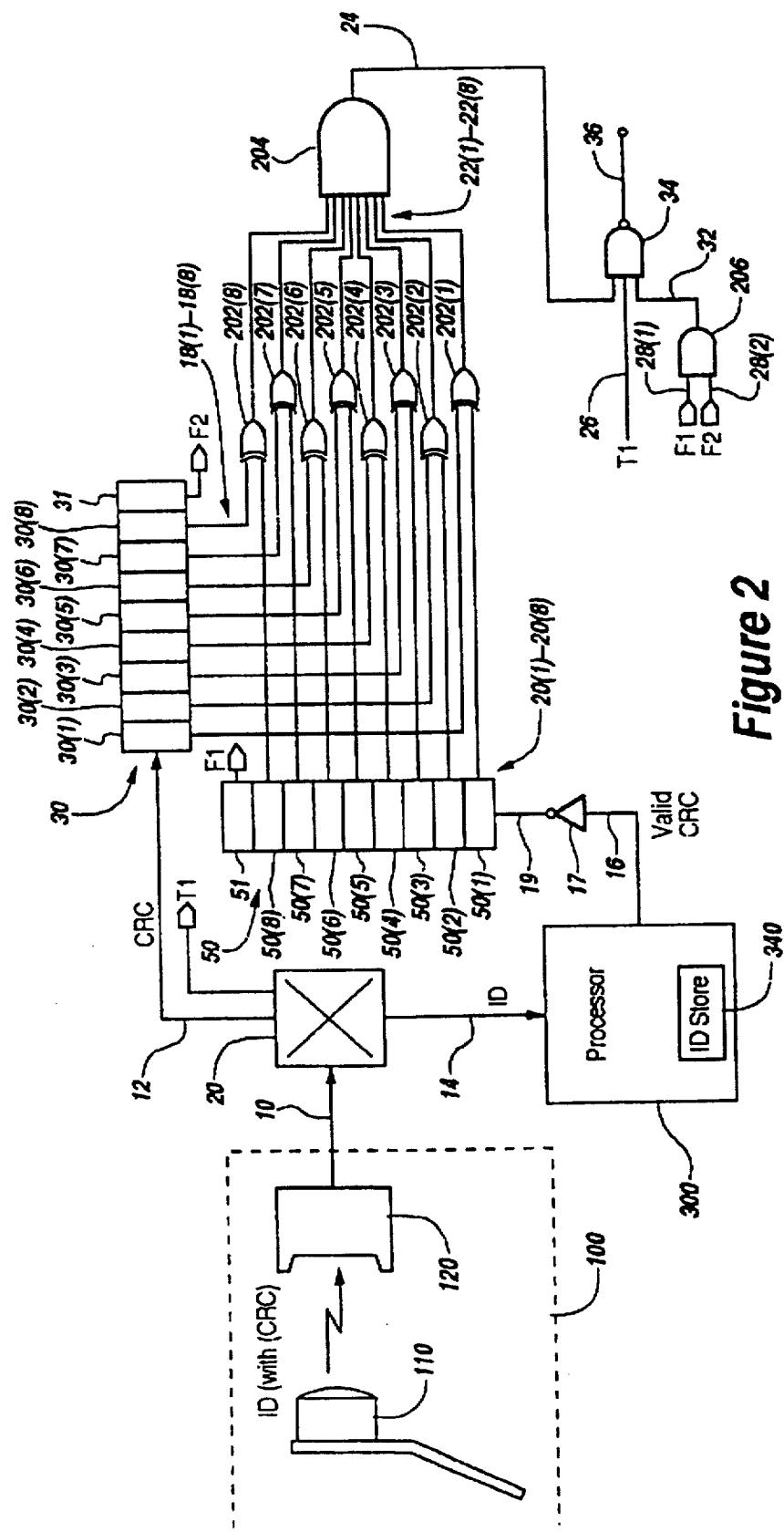
FIG. 2 is a block diagram illustrating the logic circuitry used in one embodiment of the invention.

Referring now to FIG. 2, there is shown another embodiment of the invention. As with the embodiment previously discussed, this embodiment contains an ID source 100, a splitter 20, a processor 300 which further comprises an ID store 340 and circuitry for performing verification. As may be seen, the splitter 20 transmits to the shift register 30 over line 12 the CRC value which was received from ID source 100. Shift register 30 contains eight bit registers 30(1)–30(8) for storing the 8 bits which form the CRC and a bit register 31 which acts as a status register.

As may be seen, splitter 20 transmits the ID received from ID source 100 to processor 300 over line 14. Processor 300 then utilizes such ID to communicate with ID store 340 to extract a previously stored valid CRC for transmission on line 16 to shift register 50. An inverter, however, is placed in line such that each bit transmitted from processor 300 is inverted and then transmitted by inverter 17 on line 19 to shift register 50. As may be seen, each bit received is stored in bit registers 50(1)–50(8). Shift register 50 further comprises a bit register 51 which acts as a status register.

Because the inverter 17 causes the logical inversion of each bit of the stored CRC value, each of the 8 bits in bit registers 50(1)–50(8) should be the logical opposite to the bits stored in bit registers 30(1)–30(8) if a valid ID was received by splitter 20 on line 10.

As may be seen from examining FIG. 2, each of the bit registers 30(1)–30(8) and 50(1)–50(8) are connected to a plurality of EXCLUSIVE OR gates 202(1)–202(8). Specifically, registers 50(1) and 30(1) form the two inputs to EXCLUSIVE OR gate 202(1). In general, the two inputs to EXCLUSIVE OR gate 202(n) are connected to the two bit registers 50(n) and 30(n) by lines 20(n) and 18(n), respectively.

The outputs of each of the EXCLUSIVE OR gates are connected to an AND gate 204 by lines 22(1)–22(8). As may be seen, therefore, AND gate 204 will only produce a logic 1 when each EXCLUSIVE OR gate produces an output of a logic 1, which result occurs only when the two inputs to each exclusive OR gate have opposite states. Accordingly, because of inverter 17, the bit registers 30(1)–30(8) will only have values which are logical opposites to the bit registers 50(1)–50(8) when the valid CRC value transmitted by processor 300 on line 16 is identical to the received CRC value which is transmitted by splitter 20 on line 12.

Continuing to examine FIG. 2, it may be seen that the output of AND gate 204 which is transmitted on line 24 is not the final verification. Rather, NAND gate 34 produces an output which is the initiation signal. The inputs of NAND gate 34 include the output of AND gate 204, a timing signal on line 26, and the output of AND gate 206 on line 32. AND gate 206, in turn, has two inputs connected to lines 28(1) and 28(2) wherein line 28(1) is coupled to flag register 51 of shift register 50, while line 28(2) is coupled to flag register 31 of shift register 30. Flag registers 31 and 51 reflect the presence of "Fresh Data" as understood by those skilled in the art. As such, the output of NAND gate 34 on line 36 will be a logic zero thereby reflecting proper verification if the flag registers 31 and 51 of shift registers 30 and 50, respectively, are both set to reflect that the shift registers have received fresh data, while at virtually the same time, line 24 indicates that the stored CRC value matches the received CRC value, and while the timing state signal received on line 26 reflects that a predetermined amount of time since an access request was made has not yet expired.

The timing signal is used in the embodiment of FIG. 2 to insure that the operation which generates the initiation signal occurs within a predetermined amount of time from receipt of one access request over line 10 from ID source 100. In this embodiment, the timing signal is generated as in a splitter 20, which splitter 20 includes a processor for separating the ID and for generating a proper timing signal.

Based upon the foregoing, those skilled in the art should now fully understand that the present invention provides an apparatus and method which avoids inadvertent actuation of a motor or inadvertent initiation of a process as a result of software error. The advantages of the invention, based upon the foregoing, include the rapid and reliable validation of the ID of one seeking to gain access, initiate the actuation of a motor, or to initiate a process of some sort, all of which generally limit control or access to a select number of individuals or ID sources.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. A microprocessor based system wherein software is verified by hardware, comprising:

a first register for storing a first value;

means for creating a second value at a time substantially near a critical point in a software program;

comparator circuitry for comparing said first value with said second value and for determining if said first value coincides with said second value, when said first value and second value coincide then hardware has verified that a step of software has not been skipped during software execution.

2. The system of claim 1, wherein said second value is derived from said first value.

3. A system for verifying that software completed important steps in a program, comprising:

a first register for storing a first value;

a second register for storing a second value substantially near a predetermined step in a software program;

means for comparing said first value with said second value to determine if said first value and said second value coincide, when said first value and said second value coincide then said means for comparing has verified that at least a predetermined number of software steps have been completed.

4. A method of verifying that software has not skipped over important program steps, comprising the steps of:

a. storing a first value;

b. stepping through a program until a predetermined step in the program has been executed;

c. storing a second value;

d. stepping through the program;

e. determining whether the first value and the second value correspond when said first value and said second value correspond a verification is established that predetermined software steps were not skipped; and f. executing a predetermined command if the first value and the second values correspond.

5. A circuit for verifying software functionality, comprising:

means for storing ID's;

means for receiving ID's; and means for comparing said stored ID's with said received ID's, said comparing means establishing that software is functioning correctly when a successful comparison is made between said stored ID's and said received ID's.

6. The circuit of claim 5, wherein said means for storing ID's includes a store for storing at least part of an ID for a plurality of ID's.

7. The circuit of claim 6, wherein said part of an ID is the CRC of an ID.

8. The circuit of claim 7, wherein said means for comparing ID's includes a first register and a second register.

9. A circuit for verifying software functionality, comprising:

a first register for storing a first portion of an ID;

a store for storing a first portion of a plurality of ID's;

means for receiving a signal, which includes an ID at a first point of a program execution, wherein said means is coupled to said first register and to said store, and wherein said means transmits a first portion of said signal to said first register and a second portion of said signal to said store;

a second register coupled to said store, wherein said store transmits to said second register a stored signal, which stored signal corresponds with said second portion of said ID and which corresponds in form and structure to said first portion of said signal; and means for comparing the contents of said first register to the contents of said second register at a second point of said program execution and for outputting a signal reflecting whether contents of said first and said second registers are identical and for allowing said program to continue execution if the contents of said first and said second registers are identical.

10. The circuit of claim 9, wherein said first portion reflects the value of a first cyclic redundancy check and wherein said stored signal reflects the value of a second cyclic redundancy check.

11. The circuit of claim 10, wherein said second portion of said signal includes a value reflecting an ID.

12. The circuit of claim 11, wherein means for receiving is comprised of a node and wherein said signal, said first portion, and said second portion are identical.

13. The circuit of claim 11, wherein said means for receiving is comprised of a splitter wherein said first portion and said second portion are not the same and are both a part of said signal.

14. The circuit of claim 11, wherein said second cyclic redundance check is inverted, bit by bit, prior to storage in said second register.

15. The circuit of claim 14, wherein said means for comparing includes at least one EXCLUSIVE OR gate and wherein an EXCLUSIVE OR operation is performed, bit for bit, between the contents of said first register and said second register to determine whether said signals reflecting said first cyclic redundancy check and said second cyclic redundancy check are identical.

16. The circuit of claim 15, wherein software functionality is verified when said signals reflecting said first cyclic redundancy check and said second cyclic redundancy check are identical, when a first status register indicates that a first data in said first register is fresh, and when a second status register indicates that a second data in said second register is fresh.

17. The circuit of claim 15, wherein software functionality is verified when said signals reflecting said first cyclic redundancy check and said second cyclic redundancy check are identical, when a first status register indicates that a first data in said first register is fresh, and when a second status register indicates that a second data in said second register is fresh and a timing signal reflects a predetermined logic state.

18. A method of verifying software functionality comprising the steps of:

receiving a signal, which signal comprises an ID having a first portion and a second portion;

transmitting said first portion of said ID to a first register at a first point during a program execution;

transmitting said second portion of said ID to an ID store;

finding a stored first portion stored within said store, which stored first portion corresponds to said second portion and transmitting said stored first portion to a second register at a second point during said program execution;

comparing the contents of said first register to the contents of said second register; and outputting a signal reflecting whether said contents of said first register corresponds to said contents of said second register.

19. The method of claim 18, which further comprises the step of determining if said step of comparing occurred with fresh data in said first and said second registers.

20. The method of claim 19, which further comprises the step of concluding the software is functioning properly only while a timing signal is a logic 1.

* * * * *